(12) United States Patent
Mabuchi

(10) Patent No.: US 9,126,601 B2
(45) Date of Patent: Sep. 8, 2015

(54) METHOD AND SYSTEM FOR A VEHICLE INFORMATION INTEGRITY VERIFICATION

(75) Inventor: Mitsuhiro Mabuchi, Shinagawa-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/344,434

(22) PCT Filed: Sep. 11, 2012

(86) PCT No.: PCT/IB2012/001739
§ 371 (c)(1),
(2), (4) Date: Mar. 12, 2014

(87) PCT Pub. No.: WO2013/045988
PCT Pub. Date: Apr. 4, 2013

(65) Prior Publication Data
US 2014/0343787 A1 Nov. 20, 2014

(30) Foreign Application Priority Data
Sep. 12, 2011 (JP) ................................ 2011-198390

(51) Int. Cl.
*G06F 7/00* (2006.01)
*G11C 29/00* (2006.01)
*B60W 50/04* (2006.01)
*G06F 21/64* (2013.01)
*G06F 21/57* (2013.01)
*H04L 29/08* (2006.01)
*H04L 29/06* (2006.01)
*H04L 12/40* (2006.01)

(52) U.S. Cl.
CPC ............. *B60W 50/04* (2013.01); *G06F 21/572* (2013.01); *G06F 21/64* (2013.01); *H04L 63/12* (2013.01); *H04L 63/14* (2013.01); *H04L 67/12* (2013.01); *G06F 2221/2107* (2013.01); *H04L 2012/40215* (2013.01); *H04L 2012/40273* (2013.01)

(58) Field of Classification Search
USPC ........................................... 701/31.7; 365/201
See application file for complete search history.

(56) References Cited

U.S. PATENT DOCUMENTS

| | | | |
|---|---|---|---|
| 7,912,597 B2 * | 3/2011 | Yamada ....................... | 701/31.4 |
| 2005/0190619 A1 * | 9/2005 | Wakiyama .................... | 365/201 |
| 2007/0083304 A1 * | 4/2007 | Yamada .......................... | 701/29 |
| 2007/0185624 A1 * | 8/2007 | Duddles et al. ................... | 701/1 |
| 2009/0086015 A1 * | 4/2009 | Larsen et al. .................... | 348/46 |
| 2010/0061404 A1 * | 3/2010 | Newald .......................... | 370/503 |
| 2011/0010435 A1 * | 1/2011 | Okaya et al. .................... | 709/219 |

FOREIGN PATENT DOCUMENTS

| | | |
|---|---|---|
| JP | 2005 242871 | 9/2005 |
| JP | 2005 326339 | 11/2005 |
| JP | 2007 241371 | 9/2007 |

OTHER PUBLICATIONS

International Search Report Issued Jan. 21, 2014 in PCT/IB12/001739 Filed Sep. 11, 2012.

* cited by examiner

*Primary Examiner* — Thomas G Black
*Assistant Examiner* — Tyler Paige
(74) *Attorney, Agent, or Firm* — Oblon, McClelland, Maier & Neustadt, L.L.P.

(57) ABSTRACT

A vehicle network system is configured such that a plurality of ECUs that allow internal data to be modified are connected to a network so as to be communicable with one another. The system determines whether the internal data of a first ECU has been modified on the basis of a comparison between combined data and a check value. The combined data is created by collecting and combining pieces of split data, split from original data generated on the basis of the internal data of the first ECU and distributed and held in the plurality of ECUs. The check value is generated on the basis of internal data held in the first ECU at each point in time.

19 Claims, 7 Drawing Sheets

METHOD AND SYSTEM FOR A VEHICLE INFORMATION INTEGRITY VERIFICATION

BACKGROUND OF THE INVENTION

1. Field of the Invention

The invention relates to a vehicle network system and a vehicle information processing method that uses the network system.

2. Description of Related Art

In a vehicle network system, a plurality of electronic control units (ECUs) each are connected to a network. Then, pieces of information in the respective ECUs are exchangeable among the ECUs.

Then, for each of the ECUs network-connected to the above vehicle network system, work for maintenance and update of a program of the ECU is often carried out via a maintenance device, such as a tester, externally connected to the vehicle network. That is, the program of the ECU is updated through rewriting, that is, reprogrammed, through the maintenance device connected to the vehicle network.

On the other hand, the program contents of each network-connected ECU may be changed via the network. That is, a program of such an ECU may be tampered through, for example, reprogramming improperly executed by a maintenance device illegally connected to the network or may be tampered through unauthorized access to the network by some means. Then, there has been suggested a system that detects whether a program of an ECU connected to a vehicle network has been tampered, and one example of the system is described in Japanese Patent Application Publication No. 2005-242871 (JP 2005-242871 A).

In the system described in JP 2005-242871 A, a plurality of ECUs and one gateway are connected to a vehicle network so as to be communicable with one another. Each ECU transmits a hash value of data incorporated in itself to the gateway as an ignition switch (IG) is turned off. Upon receiving the hash value, the gateway stores the transmitted hash value of each ECU as comparison data in an EEPROM. On the other hand, when each ECU starts operation as the IG is turned on, each ECU transmits the hash value of data incorporated in itself to the gateway. By so doing, the gateway compares the transmitted hash value with the corresponding comparison data stored in the EEPROM for each ECU. Then, when a mismatch occurs between the transmitted hash value and the corresponding comparison data, the gateway determines that the data of that ECU has been tampered.

Resistance against tampering (tamper resistance) with a device that determines whether data has been tampered as described above and each ECU itself is desired. Therefore, it has been studied that, for example, a tamper-resistant memory is employed in those devices. However, if such a memory is employed, it is complicated for the vehicle network system to handle data, including reprogramming, and the like, and it is unavoidable to increase the cost of the vehicle network system due to usage of an expensive memory.

SUMMARY OF THE INVENTION

The invention provides a vehicle network system that is able to determine whether internal data has been modified in an electronic control unit connected to a vehicle network, and a vehicle information processing method that uses the network system.

A first aspect of the invention provides a vehicle network system. The vehicle network system includes: a plurality of electronic control units that are connected to a vehicle network so as to be communicable with each other and that allow internal data to be modified, wherein a predetermined electronic control unit that is one of the plurality of electronic control units generates first data on the basis of the internal data held in the predetermined electronic control unit, the plurality of electronic control units include a distributing unit that distributes pieces of split data, split from the first data, to the plurality of electronic control units and a determining unit that determines whether the internal data held in the predetermined electronic control unit has been modified on the basis of a comparison, made by at least one of the plurality of electronic control units, between second data that is created by combining collected pieces of split data, held in the plurality of electronic control units, and third data generated on the basis of internal data held by the predetermined electronic control unit each time.

A second aspect of the invention provides a vehicle information processing method used in a vehicle network system in which a plurality of electronic control units are connected so as to be communicable with each other. The vehicle information processing method includes: generating first data in advance on the basis of internal data held in a predetermined electronic control unit; splitting the generated first data into a plurality of pieces of split data; distributing the plurality of pieces of split data among the plurality of electronic control units; generating second data by recovering and combining the pieces of split data; generating third data on the basis of internal data held in the predetermined electronic control unit at each point in time; and determining whether the internal data held in the predetermined electronic control unit has been modified through a comparison between the second data and the third data.

According to the first and second aspects, it is determined whether the internal data of the predetermined electronic control unit has been modified on the basis of a comparison between the second data and the third data. Because the second data is created from the plurality of pieces of split data, split and distributed among the plurality of electronic control units, those plurality of pieces of split data are less likely to be individually modified. That is, it is difficult to modify the plurality of pieces of split data, so high security of the second data created from the plurality of pieces of split data is maintained. In addition, with this configuration, even in a system that uses electronic control units equivalent to those of the related art, it is possible to determine whether the internal data has been modified with higher security than that in the related art. In this way, by comparing the second data having improved security with the third data, it is possible to determine whether the internal data of the electronic control unit connected to the vehicle network has been modified.

In addition, even when the internal data of the predetermined electronic control unit is updated or reprogrammed, it is possible to determine whether the internal data has been modified. That is, the pieces of split data, split from the first data generated on the basis of the updated internal data are distributed and held in the plurality of electronic control units. By so doing, it is possible to compare the second data with the third data.

In the above configuration, the predetermined electronic control unit may make a comparison between the second data and the third data.

In the above method, the comparison between the second data and the third data may be made by the predetermined electronic control unit.

With the above configuration or method, the predetermined electronic control unit that is intended for determination as to whether the internal data has been modified determines in itself whether the internal data has been modified. That is, the electronic control unit intended for modification determination and the electronic control unit that makes modification determination are the same predetermined electronic control unit, so it is possible to quickly execute a process, or the like, in the predetermined electronic control unit in response to whether the internal data has been modified.

In the above configuration, the predetermined electronic control unit may hold the second data and the third data.

In the above method, the second data and the third data may be held by the predetermined electronic control unit.

With the above configuration or method, when it is determined whether the predetermined electronic control unit has been modified, it is possible to acquire the second data and the third data from the intended predetermined electronic control unit, so it is easy to acquire those second data and third data.

In the above configuration, the predetermined electronic control unit may generate the first data and the third data.

In the above method, the first data and the third data may be generated by the predetermined electronic control unit.

With the above configuration or method, the first data and the third data are generated by the predetermined electronic control unit that has the internal data based on which the first data and the third data are generated, so it is easy to generate those first data and third data. In addition, generation of the first data and the third data based on internal data is appropriately performed by the predetermined electronic control unit that has the internal data. By so doing, it is suitably determined whether the internal data has been modified.

In the above configuration, the predetermined electronic control unit may distribute the pieces of split data, split from the first data, among the plurality of electronic control units.

In the above method, the pieces of split data, split from the first data, may be distributed among the plurality of electronic control units by the predetermined electronic control unit.

With the above configuration or method, the plurality of pieces of split data are split and distributed by the predetermined electronic control unit, so the predetermined electronic control unit by itself is able to recover the plurality of pieces of split data required to determine whether the internal data has been modified. In addition, the predetermined electronic control unit is, for example, able to distribute split data in response to a modification of internal data as needed, so the flexibility of distribution of split data improves. By so doing, it is suitably determined whether the internal data has been modified.

In the above configuration, the split data may also be distributed to the predetermined electronic control unit.

In the above method, the split data may also be distributed to the predetermined electronic control unit.

With the above configuration or method, the predetermined electronic control unit is able to not only hold its own split data but also, for example, hold the split data of one of the other electronic control units as well. By so doing, it is possible to make the vehicle network system compatible widely with determination as to whether the internal data has been modified.

In the above configuration, when the internal data of the predetermined electronic control unit is modified, the split data held in the predetermined electronic control unit may be moved to one of the other electronic control units.

The above method may further include, when the internal data of the predetermined electronic control unit is modified, moving the split data held in the predetermined electronic control unit to one of the other electronic control units.

With the above configuration or method, the split data held in the predetermined electronic control unit is moved to one of the other electronic control units in response to a modification or reprogramming of the internal data, so the split data is maintained even through reprogramming of the predetermined electronic control unit. That is, in the vehicle network system, split data is usable even after reprogramming. The split data to be moved may be the split data distributed from one of the other electronic control units. By so doing, the flexibility of the configuration of the vehicle network system improves.

In the above configuration, after the internal data has been modified, the one of the other electronic control units may move the split data, moved to the one of the other electronic control units, to the predetermined electronic control unit.

The above method may further include, after the internal data has been modified, moving the split data, moved to the one of the other electronic control units, to the predetermined electronic control unit.

With the above configuration or method, the split data is returned to the predetermined electronic control unit, so the split data is usable after reprogramming. This improves convenience in determination as to whether the internal data has been modified. The split data returned to an original state at this time is split data distributed from one of the other electronic control units, so, even when the predetermined electronic control unit is reprogrammed, it is possible to determine whether the internal data of the one of the other electronic control units has been modified. By so doing, the flexibility of the configuration of the vehicle network system improves.

A third aspect of the invention provides a vehicle network system. A vehicle network system includes: a plurality of electronic control units that are connected to a vehicle network so as to be communicable with each other and that allow internal data to be modified, wherein the plurality of electronic control units generate first data on the basis of internal data held in a first electronic control unit that is one of the plurality of electronic control units, the plurality of electronic control units generates second data created by collecting and combining pieces of split data, split from the first data and distributed and held in the plurality of electronic control units, and the plurality of electronic control units determine whether the internal data held in the first electronic control unit has been modified through a comparison between the first data with the second data, made by at least one of the plurality of electronic control units.

A fourth aspect of the invention provides a vehicle network system. A vehicle network system includes: a plurality of electronic control units that are connected to a vehicle network so as to be communicable with each other and that allow internal data to be modified, wherein a first electronic control unit that is one of the plurality of electronic control units includes: a generating unit that generates first data on the basis of the internal data held in a predetermined electronic control unit; a splitting unit that splits the generated first data to generate a plurality of pieces of split data; a distributing unit that distributes the pieces of split data among the plurality of electronic control units and causes the plurality of electronic control units to hold the pieces of split data; a combining unit that collects and combines the pieces of split data, distributed and held in the plurality of electronic control units, to generate second data; and a determining unit that determines whether the internal data held in the predetermined electronic control unit has been modified on the basis of a comparison between the second data and third data generated on the basis of internal data held in the predetermined electronic control unit at each point in time.

According to the third and fourth aspects, even in a system that uses electronic control units equivalent to those of the related art, it is possible to determine whether the internal data has been modified with higher security than that in the related art.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
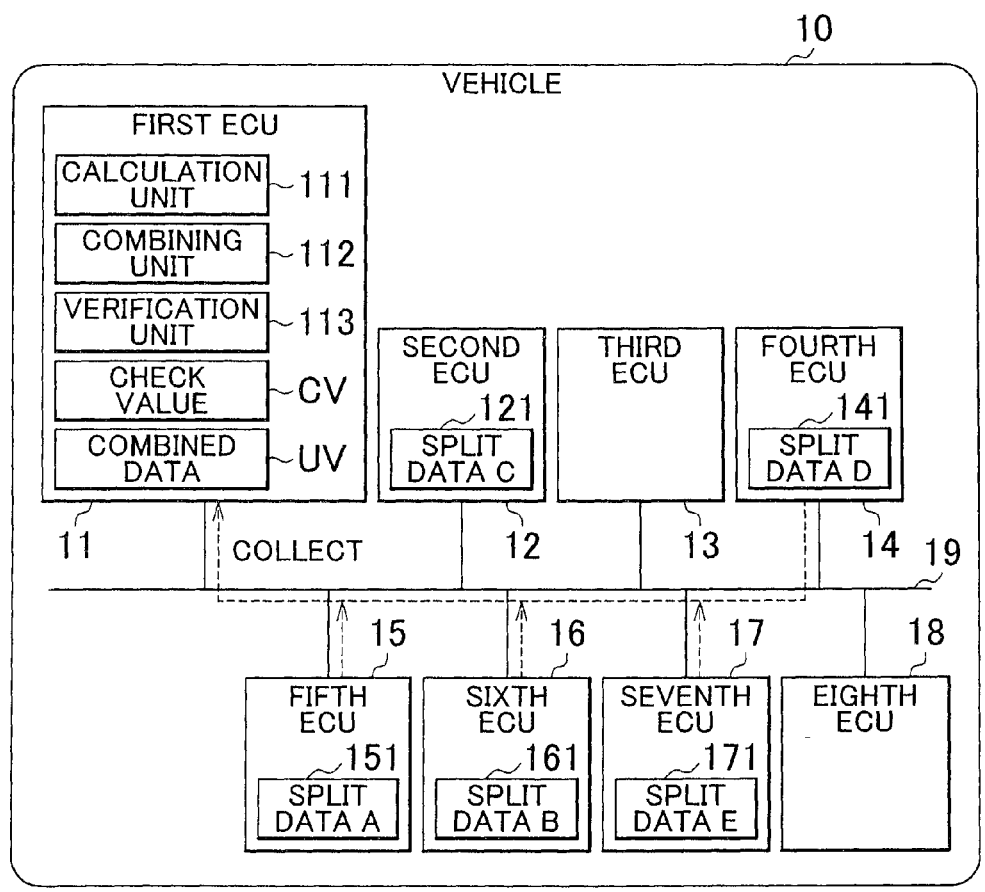
FIG. 1 is a block diagram that shows the schematic configuration of a vehicle network system according to a first embodiment of the invention.

A vehicle network system according to a first embodiment of the invention will be described with reference to FIG. 1 and FIG. 2.

A vehicle 10 includes the vehicle network system. The vehicle network system includes first to eighth electronic control units (ECUs) 11 to 18 and a network 19. The network 19 connects those first to eighth ECUs 11 to 18 such that the first to eighth ECUs 11 to 18 are communicable with one another.

The network 19 is formed of, for example, a vehicle network, such as a controller area network (CAN), and allows the first to eighth ECUs 11 to 18 connected to the network 19 to carry out information communication with one another. That is, each of the first to eighth ECUs 11 to 18 includes a transmitting unit and a receiving unit (which are not shown) that are able to exchange communication signals compliant with a communication protocol of the network 19 in order to allow intercommunication via the network 19. Then, each of the first to eighth ECUs 11 to 18 is configured to transmit various pieces of control data, or the like, to the network 19 via the transmitting unit and also to receive various pieces of control data, or the like, from the network 19 via the receiving unit.

Each of the first to eighth ECUs 11 to 18 is a control unit used in various controls over the vehicle 10, and is an ECU that is intended for control over, for example, a drive system, a travelling system, a vehicle body system, an information device system, or the like. For example, the ECU intended for control over the drive system is an engine ECU, the ECU intended for control over the travelling system is a steering ECU or a brake ECU, the ECU intended for control over the vehicle body system is a lamp ECU or a window ECU, and the ECU intended for control over the information device system is a car navigation ECU.

Each of the first to eighth ECUs 11 to 18 is configured to include a microcomputer that has a processing unit and a storage device. That is, each of the first to eighth ECUs 11 to 18 includes a processing unit (CPU), a read only memory (ROM) and a volatile memory (RAM). The processing unit executes arithmetic processing of a control program. The read only memory stores a control program, data, and the like, required for control. The volatile memory temporarily stores a processing result of the CPU. By so doing, each of the first to eighth ECUs 11 to 18 executes an intended control in the following manner. The control program, and the like, held in the storage device are loaded onto the processing unit and are executed. At this time, the first to eighth ECUs 11 to 18 exchange data required for corresponding controls with one another via the network 19.

In addition, the first ECU 11 that serves as a first electronic control unit in the present embodiment further includes a nonvolatile memory (EEPROM) as a memory that stores a control program, data, and the like, required for control. That is, the first ECU 11 executes an intended control in the following manner. The control program, and the like, held in the EEPROM are also loaded onto the processing unit, and are executed. The control program, and the like, held in the EEPROM are reprogrammable. Thus, the first ECU 11 allows the control program, and the like, held in the EEPROM to be updated to the latest state by reprogramming the control programs, and the like, at, for example, a dealer.

Reprogramming is executed as follows. When a maintenance device (not shown), such as a tester, is connected to the network 19 so as to be communicable with the first ECU 11 via the network 19, a new software program is written into the EEPROM of the first ECU 11 through the maintenance device on the basis of a predetermined procedure. On the other hand, because the first ECU 11 allows the data contents of the EEPROM to be modified, the data contents may be subjected to so-called tampering, that is, improper reprogramming is executed by an improper maintenance device or part of the program is rewritten through unauthorized access, virus, or the like, via the network 19 by some means. Then, in the present embodiment, it is determined whether the internal data of the first ECU 11 has been modified.

The first ECU 11 includes a calculation unit 111, a combining unit 112 and a verification unit 113 on the basis of a process executed by the control program, and ensures a holding area of an each-time check value CV and a holding area of a combined data UV. The combined data UV corresponds to second data. The each-time check value CV corresponds to third data.

The calculation unit 111 calculates an each-time check value CV, corresponding to current internal data of the first ECU 11, as a hash value on the basis of the control program, and the like, stored in the EEPROM. That is, the calculation unit 111 calculates the hash value of the internal data as the each-time check value CV by which it is determined whether the internal data has been modified on the basis of a predetermined hash function. The hash function generates a pseudo-random number (hash value, message digest) from the internal data. Note that, theoretically, it is extremely difficult to create different internal data (for example, manipulated internal data) having the same hash value, so a hash value created through the hash function is guaranteed that the hash value uniquely corresponds to the internal data at the time of creation (present time).

The combining unit 112 collects pieces of split data A to E respectively held in the second ECU 12 and the fourth to seventh ECUs 14 to 17, and combines the collected pieces of split data A to E. The pieces of split data A to E are generated by splitting original data FV into five. The original data FV corresponds to internal data at the time when the pieces of split data A to E are created. The order in which the original data FV are split matches with the alphabetical order of the pieces of split data A to E. The original data FV corresponds to first data. At this time, the original data FV is calculated with the use of the same hash function as that with which the calculation unit 111 calculates the each-time check value CV, that is, the original data FV is formed of a hash value obtained through the hash function on the basis of the internal data at the time when the pieces of split data A to E are created. By so doing, the combining unit 112 combines the pieces of split data A to E to generate combined data UV corresponding to the original data FV.

Furthermore, the combining unit 112 has an order list that stores which ECUs the pieces of split data A to E are respectively distributed to. That is, the order list stores that the split data A is distributed to the fifth ECU 15, the split data B is distributed to the sixth ECU 16, the split data C is distributed to the second ECU 12, the split data D is distributed to the fourth ECU 14, and the split data E is distributed to the seventh ECU 17. By so doing, the combining unit 112 collects the pieces of split data A to E from the ECUs in alphabetical order in accordance with the order list, and combines the pieces of split data A to E in accordance with the collected order to create the combined data UV.

The verification unit 113 determines whether the internal data has been modified on the basis of a comparison between the present-time (each-time) check value CV generated by the calculation unit 111 and the combined data UV generated by the combining unit 112. That is, the verification unit 113 determines that the internal data has not been modified when the each-time check value CV matches with the combined data UV; whereas the verification unit 113 determines that the internal data has been modified when the each-time check value CV does not match with the combined data UV.

The second to eighth ECUs 12 to 18 each have the function of managing split data on the basis of a process executed by the corresponding control program, and each use the function of managing the split data to ensure a split data holding area (121, 141, 151, 161, 171, or the like) in a nonvolatile memory, such as an EEPROM, as needed. Then, in the present embodiment, the split data holding area 121 of the second ECU 12 holds the split data C, the split data holding area 141 of the fourth ECU 14 holds the split data D, and the split data holding area 151 of the fifth ECU 15 holds the split data A. In addition, the split data holding area 161 of the sixth ECU 16 holds the split data B, and the split data holding area 171 of the seventh ECU 17 holds the split data E. Note that these pieces of split data A to E are respectively registered in the split data holding areas 121, 141, 151, 161 and 171 in advance. Here, the third ECU 13 and the eighth ECU 18 hold no split data; instead, those third ECU 13 and eighth ECU 18 may also hold split data instead of or in addition to the other ECUs.

Each of the second to eighth ECUs 12 to 18 has a registering function, a transmitting function and a deleting function as the function of managing split data. When the second to eighth ECUs 12 to 18, and the like, receive instructions from the first ECU 11 to collect the pieces of split data, the transmitting functions respectively acquire the pieces of split data, associated with the first ECU 11, from the corresponding holding areas, and transmit the pieces of split data to the first ECU 11. When the second to eighth ECUs 12 to 18 receive instructions from the first ECU 11 to register the pieces of split data, the registering functions respectively hold the pieces of split data in the corresponding holding areas in association with the first ECU 11. When the second to eighth ECUs 12 to 18 receive instructions from the first ECU 11 to delete the pieces of split data, the deleting functions respectively delete the pieces of split data, held in association with the first ECU 11, from the corresponding holding areas. In the first embodiment, the second to eighth ECUs 12 to 18 each do not need to have the deleting function.

Operation

Next, a modification determination process will be described with reference to FIG. 2. Note that the first ECU 11 is configured to determine whether the internal data has been modified, for example, when the ignition of the vehicle 10 is turned on.

Figure 2:
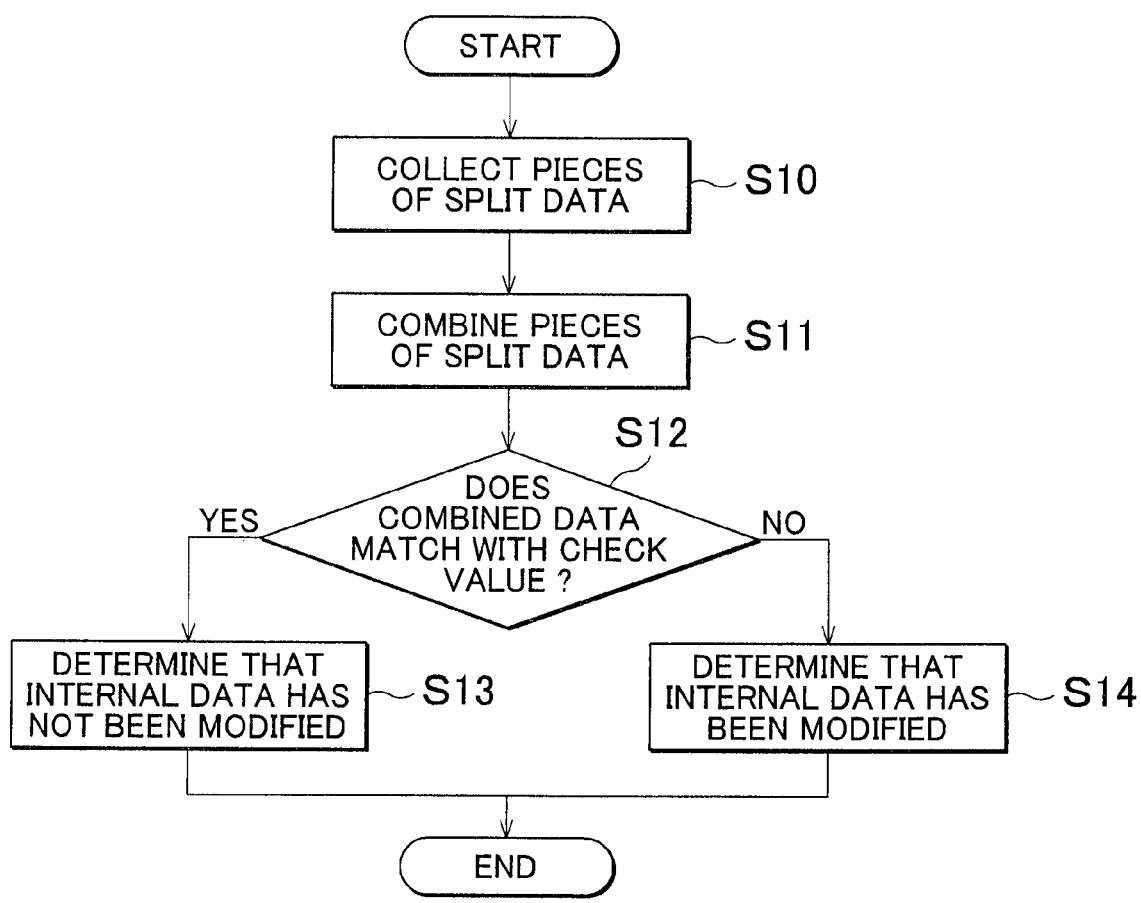
FIG. 2 is a flowchart that shows the procedure of data modification determination carried out in the vehicle network system according to the first embodiment.

As shown in FIG. 2, when the modification determination process is started, the combining unit 112 of the first ECU 11 sequentially collects the pieces of split data A to E from the ECUs that respectively hold the pieces of split data A to E (S10), and combines the collected check values to generate combined data (S11). That is, the first ECU 11 collects the split data A from the fifth ECU 15, collects the split data B from the sixth ECU 16, collects the split data C from the second ECU 12, collects the split data D from the fourth ECU 14 and collects the split data E from the seventh ECU 17, and combines the collected pieces of split data A to E in the appropriate order to generate combined data.

Subsequently, the first ECU 11 uses the verification unit 113 to determine whether the check value CV calculated by the calculation unit 111 matches with the combined data UV created by the combining unit 112 (S12). Then, when it is determined that the each-time check value CV matches with the combined data UV (YES in S12), the first ECU 11 determines that the internal data of the first ECU 11 has not been modified (S13). Then, the determined result is set in the memory, or the like, and the modification determination process is ended.

On the other hand, when it is determined that the each-time check value CV does not match with the combined data UV (NO in S12), the first ECU 11 determines that the internal data of the first ECU 11 has been modified (S14). Then, the determined result is set in the memory, or the like, and the modification determination process is ended.

The first ECU 11 recognizes whether the internal data has been modified through the determined result. When the internal data has been modified, the first ECU 11 provides an alarm to the other ECUs or takes remedies, such as stopping the process in itself. A necessary minimum function corresponding to determination as to whether the internal data has been modified may be held in the ROM and executed. By so doing, the first ECU 11 is able to further appropriately take remedies for a modification of the internal data.

As described above, with the vehicle network system according to the present embodiment, advantageous effects are obtained as listed below.

(1) It is determined whether the internal data of the first ECU 11 has been modified on the basis of a comparison between the combined data UV and the each-time check value CV. The combined data UV is created from the plurality of pieces of split data A to E respectively distributed to the second, and fourth to seventh ECUs 12 and 14 to 17, so those plurality of pieces of split data A to E are less likely to be individually modified. That is, it is difficult to modify the plurality of pieces of split data A to E, so high security of the combined data UV created from the plurality of pieces of split data A to E is maintained. In addition, with this configuration, even in a system that uses ECUs equivalent to those of the related art, it is possible to determine whether the internal data of each of those ECUs has been modified with higher security than that in the related art. In this way, by comparing the combined data UV having improved security with the each-time check value CV, it is possible to determine whether the internal data of each of the ECUs connected to the vehicle network has been modified.

In addition, even when the internal data of the first ECU 11 is updated, that is, reprogrammed, it is possible to determine whether the updated internal data has been modified. That is, the pieces of split data, split from the original data FV generated on the basis of the updated internal data are distributed and held in the plurality of electronic control units. By so doing, it is possible to compare the combined data UV with the each-time check value CV.

(2) The first ECU 11 intended for determination as to whether the internal data has been modified determines in itself whether the internal data has been modified. That is, the ECU intended for modification determination and the ECU that makes modification determination are the same first ECU 11, so it is possible to quickly execute a process, or the like, in the first ECU 11 in response to whether the internal data has been modified.

(3) When it is determined whether the internal data of the first ECU 11 has been modified, it is possible to acquire the combined data UV and the each-time check value CV from the intended first ECU 11, so it is easy to acquire those combined data UV and each-time check value CV.

Second Embodiment

Figure 3:
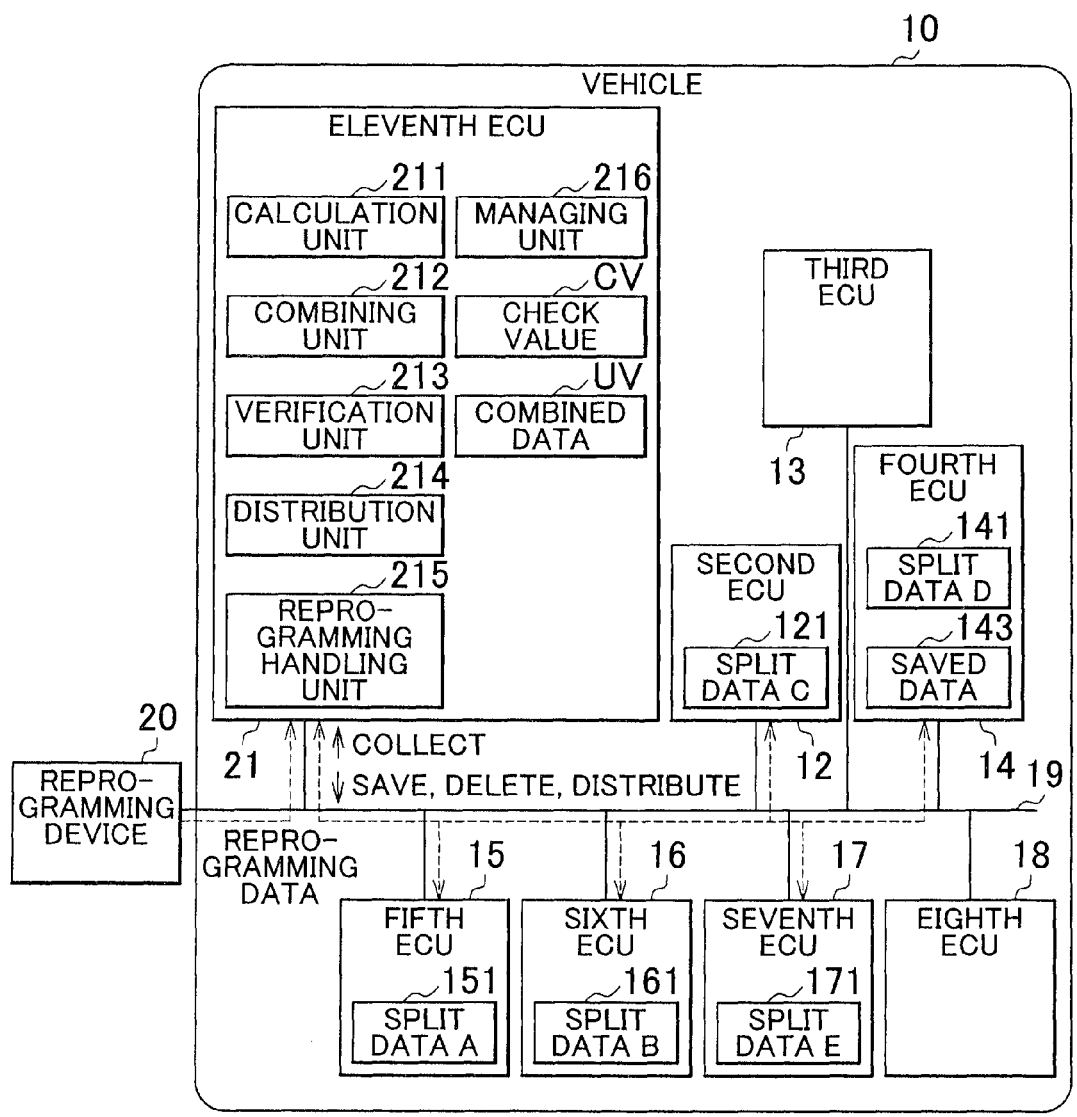
FIG. 3 is a block diagram that shows the schematic configuration of a vehicle network system according to a second embodiment of the invention.
Figure 4:
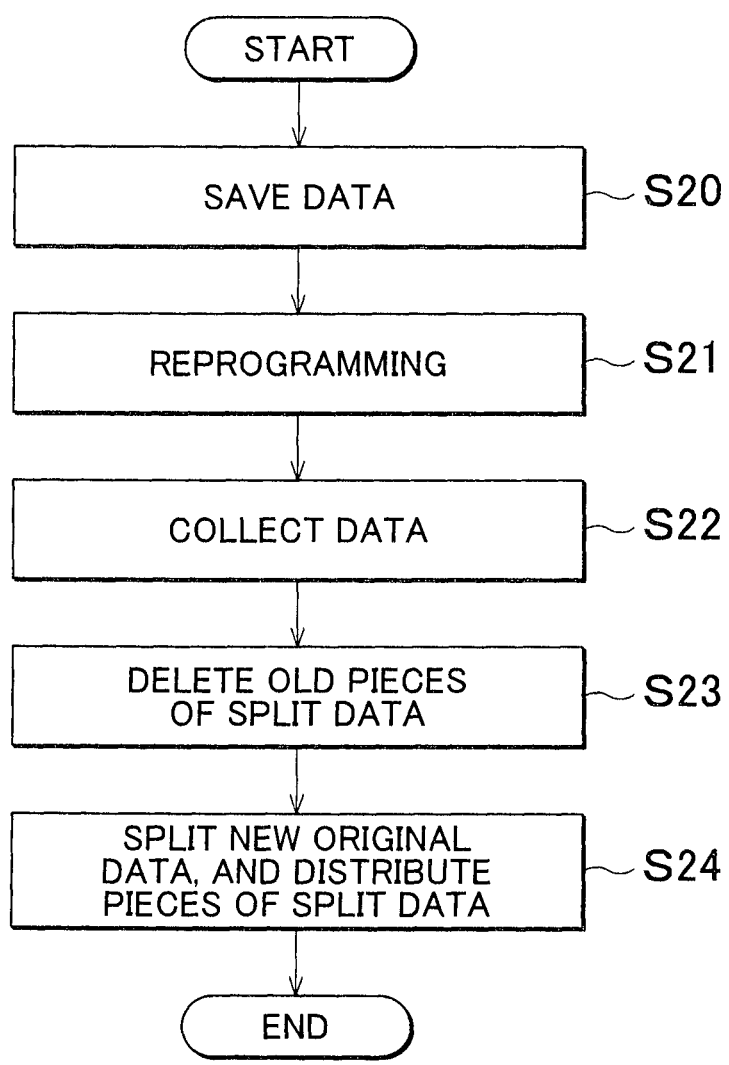
FIG. 4 is a flowchart that shows a procedure that is configured to be able to maintain modification determination even when reprogramming occurs in the vehicle network system according to the second embodiment.

A vehicle network system according to a second embodiment of the invention will be described with reference to FIG. 3 and FIG. 4.

The present embodiment differs from the first embodiment in that a reprogramming device 20 is provided and an eleventh ECU 21 is provided instead of the first ECU 11, and the other configuration is the same. Therefore, the above difference will be specifically described in the present embodiment and, for the sake of convenience of description, like reference numerals denote similar components to those of the first embodiment and the detailed description thereof is omitted.

In the present embodiment, instead of the first ECU 11 according to the first embodiment, the eleventh ECU 21 is provided as a predetermined electronic control unit. The eleventh ECU 21, as well as the first ECU 11, includes a transmitting unit and a receiving unit (which are not shown) that are able to exchange communication signals compliant with a communication protocol of the network 19. In addition, the eleventh ECU 21 includes a calculation unit 211 similar to the calculation unit 111 of the first ECU 11, a combining unit 212 similar to the combining unit 112 of the first ECU 11 and a verification unit 213 similar to the verification unit 113 of the first ECU 11, and ensures a holding area of an each-time check value CV and a holding area of combined data UV.

Furthermore, the eleventh ECU 21 includes a distribution unit 214, a reprogramming handling unit 215 and a managing unit 216. The distribution unit 214 splits original data FV into five to generate pieces of split data A to E, and distributes the generated pieces of split data A to E to other ECUs in a predetermined order (distributing function). The original data FV is formed of a hash value of internal data, of the eleventh ECU 21. The hash value is calculated in the same manner as the each-time check value CV is calculated by the calculation unit 211. Note that, in the present embodiment, the predetermined order is an order preset in an order list, and the order list sets distribution destinations that the fifth ECU 15 is the first, the sixth ECU 16 is the second, the second ECU 12 is the third, the fourth ECU 14 is the fourth and the seventh ECU 17 is the fifth.

The reprogramming handling unit 215 executes predetermined processes before and after a control program held in the EEPROM of the eleventh ECU 21 is reprogrammed through the reprogramming device 20 via the network 19. The predetermined processes are, for example, a process of moving data associated with a modification determination process to one of the other ECUs, a process of moving data, moved to one of the other ECUs, to an original ECU, and the like.

Before reprogramming is executed, the reprogramming handling unit 215 moves data used in the modification determination process, such as the order list and split data distributed from itself or one of the other ECUs, to one of the other ECUs, such as the fourth ECU 14, that is not subjected to reprogramming as saved data 143. In addition, after reprogramming, the reprogramming handling unit 215 collects the moved data from the one of the other ECUs. For example, the moved saved data 143 is collected from the fourth ECU 14. Then, the reprogramming handling unit 215 returns the data included in the collected saved data 143 to a state before reprogramming, that is, a so-called original state. For example, when the collected saved data 143 contains split data generated on the basis of the internal data of one of the other ECUs, the reprogramming handling unit 215 holds the split data in a mode in which the split data is transmittable in response to a request from the one of the other ECUs. In addition, when the collected data contains a self-check value CV and an order list, the reprogramming handling unit 215 holds them in a mode in which the self-check value CV and the order list are usable by itself. In addition, when reprogramming has been completed, in order to delete the distributed old pieces of split data A to E generated on the basis of the original data FV before reprogramming, the reprogramming handling unit 215 instructs the ECUs, holding those old pieces of split data A to E, to delete the pieces of split data A to E. At this time, the ECUs to be instructed for deletion may be specified on the basis of the order list. This prevents accumulation of old pieces of split data, which become unnecessary through reprogramming, in the respective distribution destination ECUs.

The managing unit 216 is configured to manage distributed pieces of split data. The managing unit 216 has a function similar to the function of managing the pieces of split data of the second ECU 12, and the like, in the first embodiment, and has a registering function, a transmitting function and a deleting function. That is, in response to a transmission request of split data from the host ECU or one of the other ECUs, when there is the split data corresponding to the requesting ECU, the transmitting function transmits the split data corresponding to the requesting ECU. In response to a request to register split data from the host ECU or one of the other ECUs, the registering function registers the split data received from the requesting ECU in the holding area in association with the requesting ECU. In response to a request to delete split data from the host ECU or one of the other ECUs, the deleting function deletes the split data associated with the requesting ECU from the holding area. That is, the eleventh ECU 21 is able to maintain and manage not only split data distributed from the host ECU but also split data distributed from one of the other ECUs. Note that, in the eleventh ECU 21, the split data and the order list may also be stored in the EEPROM; however, the split data and the order list are not contained in the internal data of the eleventh ECU 21 intended for modification determination. That is, the calculation unit 211 calculates original data FV or an each-time check value CV such that the original data FV or the each-time check value CV does not contain the split data or the order list.

The reprogramming device 20 is connected to the eleventh ECU 21 so as to be communicable via the network 19. Connection to the network may be wired or wireless. The reprogramming device 20 is used to update the control program, and the like, held in the EEPROM of the eleventh ECU 21 connected thereto by rewriting, that is, so-called reprogramming. The eleventh ECU 21 is configured such that the control program and data are updated to the latest state through authorized reprogramming executed by the reprogramming device 20 at a car dealer, or the like. More specifically, when the reprogramming device 20 is connected to the network 19 and is communicably connected to the eleventh ECU 21 via the network 19, a new control program held in the reprogramming device 20 is written into the EEPROM of the eleventh ECU 21 on the basis of a predetermined procedure.

On the other hand, the reprogrammable eleventh ECU 21 allows the data contents to be modified, so the data contents may be rewritten through improperly executed reprogramming or unauthorized access or manipulation via the network 19 by some means, that is, so-called tampering. Then, in the present embodiment, it is determined whether the internal data of the eleventh ECU 21 has been modified.

Operation

Next, remedies for reprogramming will be described with reference to FIG. 4. In the eleventh ECU 21, remedies are taken for reprogramming over a period before and after reprogramming is executed.

When the reprogramming device 20 is connected to the network 19 and reprogramming for the eleventh ECU 21 is prepared, the eleventh ECU 21 starts taking remedies for reprogramming. First, prior to reprogramming, the eleventh ECU 21 uses the reprogramming handling unit 215 to execute data saving by which saved data 143, including data used for the modification determination process, is moved to the fourth ECU 14 (S20). When data saving has been completed, the eleventh ECU 21 is reprogrammed (S21).

When the reprogramming has been completed, the eleventh ECU 21 collects the saved data 143 that has been moved to the fourth ECU 14 by the reprogramming handling unit 215 (S22). Then, the reprogramming handling unit 215 instructs the second and fourth to seventh ECUs 12 and 14 to 17 to delete the old pieces of split data A to E, distributed before reprogramming on the basis of the order list included in the collected saved data 143, from the second and fourth to seventh ECUs 12 and 14 to 17 (S23). In addition, the reprogramming handling unit 215 causes the calculation unit 211 to calculate new original data FV on the basis of the reprogrammed internal data of the eleventh ECU 21, splits the original data FV to generate new five pieces of split data A to E and distributes those new pieces of split data A to E on the basis of the order list (S24).

In this way, by taking remedies for reprogramming, irrespective of whether it is before or after reprogramming, the eleventh ECU 21 is able to determine whether the internal data has been modified in the vehicle network system.

As described above, with the vehicle network system according to the present embodiment, in addition to the advantageous effects (1) to (3) described in the first embodiment, advantageous effects listed below are obtained.

(4) The original data FV and the each-time check value CV are generated in the eleventh ECU, 21 that has internal data that is a source from which the original data FV and the each-time check value CV are generated, so it is easy to generate those original data FV and each-time check value CV. In addition, generation of the original data FV and the each-time check value CV based on internal data is reliably and appropriately performed in the eleventh ECU 21 that has the internal data. By so doing, it is suitably determined whether the internal data has been modified.

(5) Because the eleventh ECU 21 splits and distributes the plurality of pieces of split data A to E, the eleventh ECU 21 is able to collect the plurality of pieces of split data A to E required for modification determination by itself. In addition, the eleventh ECU 21 is able to distribute the pieces of split data A, to E in response to a modification of internal data as needed, so the flexibility of distribution of the pieces of split data A to E improves. By so doing, it is suitably determined whether the internal data has been modified.

(6) The eleventh ECU 21 may hold not only its own split data but also, for example, split data of one of the other ECUs. By so doing, it is possible to widely determine whether the internal data has been modified for each of the plurality of electronic control units that constitute the vehicle network system.

(7) When split data is held in the eleventh ECU 21 prior to a modification of internal data, that is, so-called reprogramming, the split data is moved to one of the other ECUs, so the split data is maintained even through reprogramming of the eleventh ECU 21. That is, in the vehicle network system, split data is usable even after reprogramming. For example, if saved split data is split data distributed from one of the other ECUs, the one of the other ECUs is able to determine whether the internal data has been modified on the basis of the saved split data even when the predetermined electronic control unit is reprogrammed. By so doing, the flexibility of the configuration of the vehicle network system improves.

(8) Because split data moved to one of the other ECUs is moved to an original ECU, the split data may be used for modification determination similarly before and after reprogramming. This improves convenience in determination as to whether the internal data has been modified. When split data moved to an original ECU is split data distributed from one of the other ECUs at this time, the one of the other ECUs is able to make modification determination even when the eleventh ECU 21 is reprogrammed. By so doing, the flexibility of the configuration of the vehicle network system improves.

Third Embodiment

Figure 5:
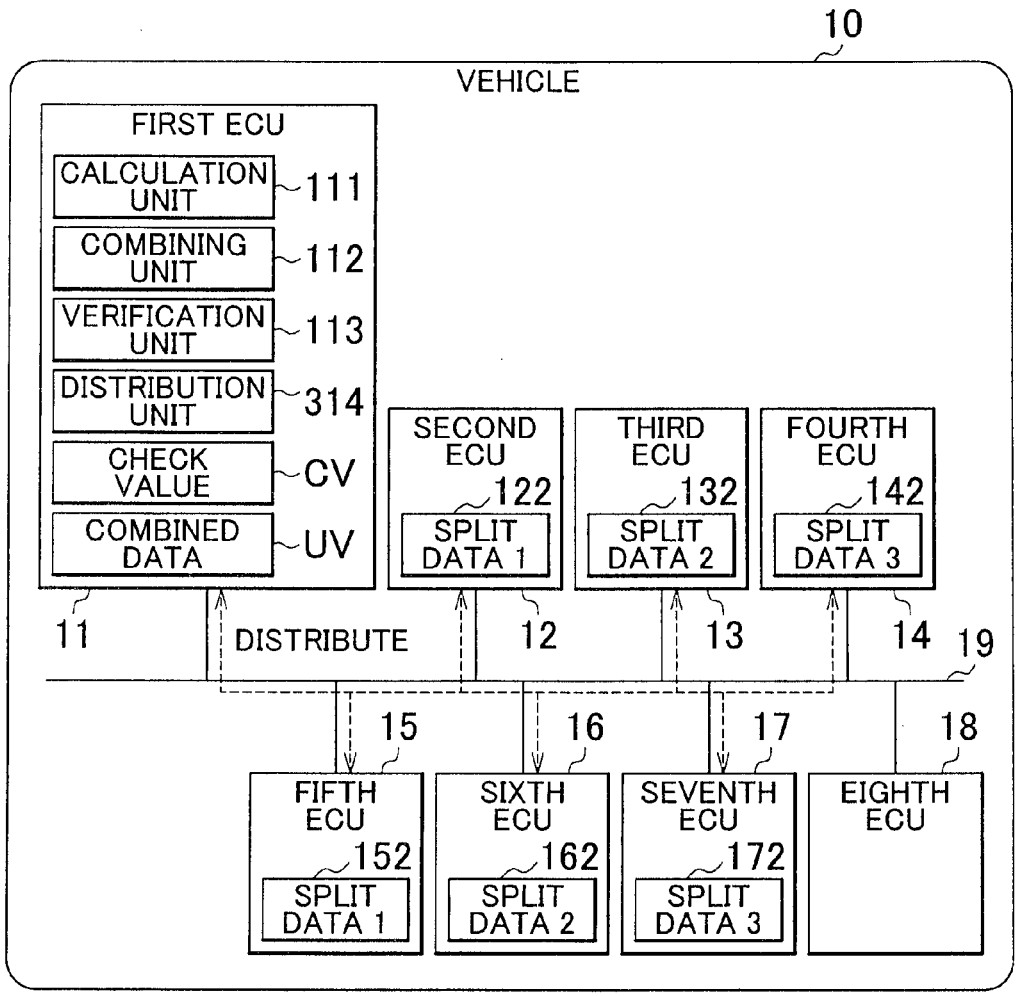
FIG. 5 is a block diagram that shows the schematic configuration of a vehicle network system according to a third embodiment of the invention.
Figure 6:
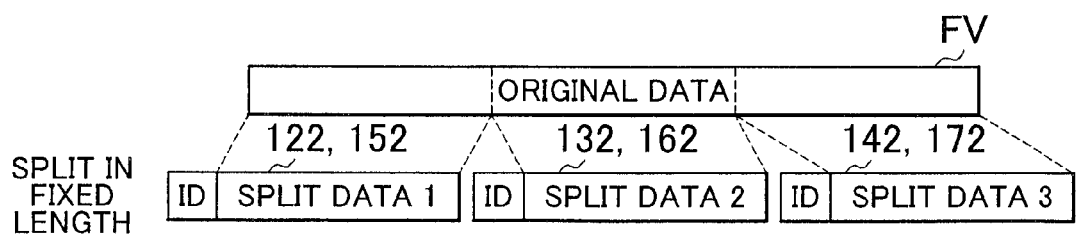
FIG. 6 is a schematic view that schematically shows pieces of split data in the third embodiment.
Figure 7:
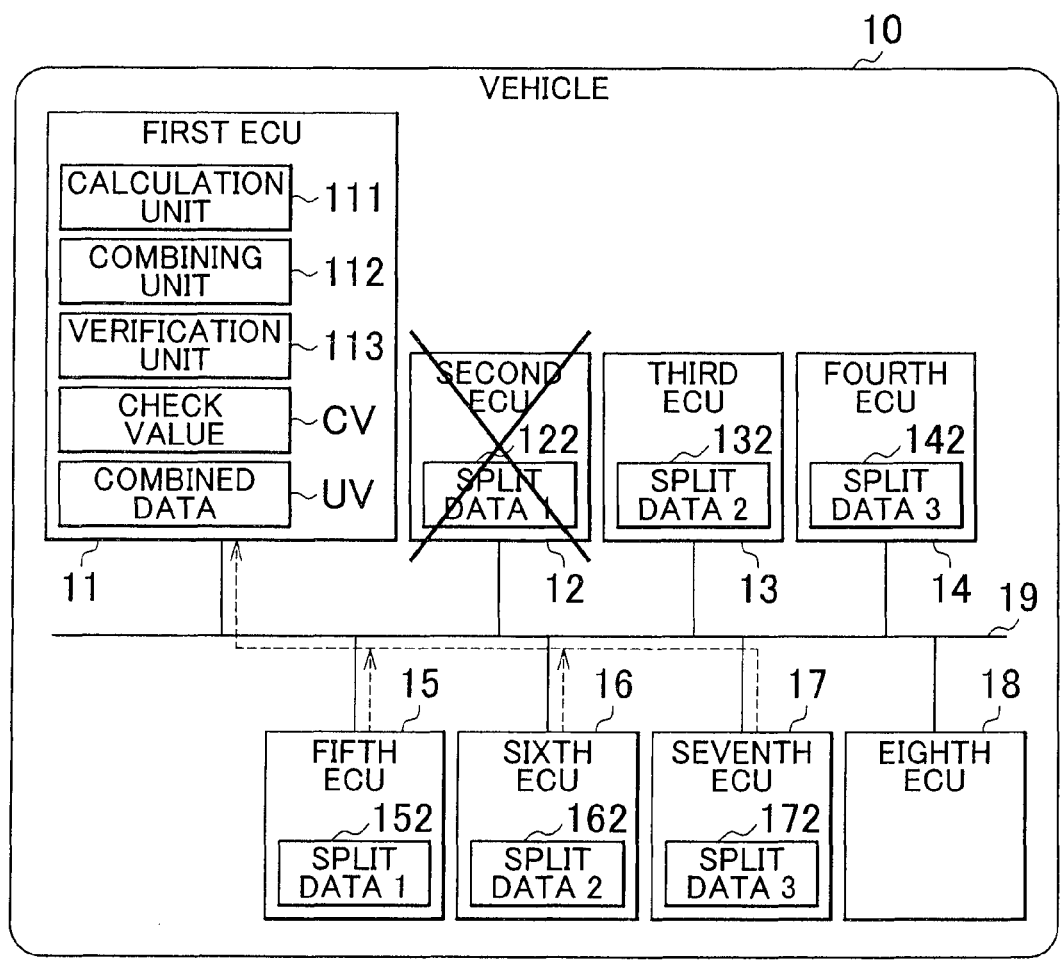
FIG. 7 is a schematic view that schematically shows collection of the pieces of split data in the third embodiment.

A vehicle network system according to a third embodiment of the invention will be described with reference to FIG. 5 to FIG. 7.

The present embodiment differs from the first embodiment in that a distribution unit 314 is provided, and the other configuration is the same. Hereinafter, the difference will be specifically described, and, for the sake of convenience of description, like reference numerals denote similar components to those of the first embodiment and the description thereof is omitted.

The distribution unit 314 has a similar function to that of the distribution unit 214 of the eleventh ECU 21 according to the second embodiment, and splits original data FV, corresponding to the internal data of the first ECU 11 and calculated by the calculation unit 111, into three to generate pieces of split data 1 to 3. As shown in FIG. 6, the pieces of split data 1 to 3 are generated by splitting the original data FV into three with a fixed length. The original data FV is formed of a hash value calculated on the basis of the internal data of the first ECU 11. Note that, when the three pieces of split data 1 to 3 are distributed to other ECUs, an ID indicating that the pieces of split data correspond to the first ECU 11 is assigned to each of the three pieces of split data 1 to 3. The ID is, for example, an identification number of the first ECU 11 in the network.

In addition, the distribution unit 314 distributes the generated pieces of split data 1 to 3 to other ECUs in round-robin scheduling. That is, the pieces of split data 1 to 3 are sequentially distributed to the second to eighth ECUs 12 to 18 in the stated order. The order of the second to eighth ECUs 12 to 18 is determined on the basis of, for example, the magnitude of an identification number in the network, assigned to each ECU, and the second to eighth ECUs 12 to 18 are identified in the same order as the order of second to eighth. In addition, in the present embodiment, the host first ECU 11 is excluded from distribution destinations; however, the host first ECU 11 may also be included in distribution destinations. Furthermore, the distribution unit 314 is configured to distribute the pieces of split data 1 to 3 two by two. Therefore, the distribution unit 314 distributes the pieces of split data 1 to 3 to the ECUs twice in the stated order. Specifically, in first distribution, the split data 1 is distributed to the second ECU 12, the split data 2 is distributed to the third ECU 13 and the split data 3 is distributed to the fourth ECU 14. Subsequently, in second distribution, the split data 1 is distributed to the fifth ECU 15, the split data 2 is distributed to the sixth ECU 16 and the split data 3 is distributed to the seventh ECU 17. When the pieces of split data 1 to 3 are distributed twice, distribution of the split data has been completed.

That is, the distribution unit 314 causes a holding area 122 of the second ECU 12 to hold the split data 1 with ID, causes a holding area 132 of the third ECU 13 to hold the split data 2 with ID and causes a holding area 142 of the fourth ECU 14 to hold the split data 3 with ID. In addition, the distribution unit 314 causes a holding area 152 of the fifth ECU 15 to hold the split data 1 with ID, causes a holding area 162 of the sixth ECU 16 to hold the split data 2 with ID and causes a holding area 172 of the seventh ECU 17 to hold the split data 3 with ID.

The pieces of split data 1 to 3 each are held in two ECUs in this way. By so doing, in the vehicle network system, redundancy is provided in holding each of the pieces of split data 1 to 3.

Operation

Next, the redundancy will be described with reference to FIG. 7. As shown in FIG. 7, if some inconvenience, or the like, occurs in the second ECU 12 and then the first ECU 11 is not able to communicate with the second ECU 12, the combining unit 112 of the first ECU 11 is not able to collect the split data 1 held in the second ECU 12. In this way, when the split data 1 cannot be collected, the first ECU 11 is not able to determine whether the internal data of the first ECU 11 has been modified. Then, in such a case, the first ECU 11 collects the other split data 1 from the fifth ECU 15, collects the other split data 2 from the sixth ECU 16 and collects the other split data 3 from the seventh ECU 17. By so doing, even when the second ECU 12 holding the split data 1 becomes incommunicable, the first ECU 11 is able to determine whether the internal data has been modified. Note that the fact that the pieces of split data 1 to 3 are also respectively distributed to the fifth to seventh ECUs 15 to 17 is known by consulting the order list.

As described above, with the vehicle network system according to the present embodiment, in addition to the advantageous effects (1) to (3) described in the first embodiment, advantageous effects list below are obtained.

(9) Because the pieces of split data 1 to 3 of the first. ECU 11 each are distributed two by two in the vehicle network system, even when one of the second to seventh ECUs 12 to 17 becomes incommunicable with the first ECU 11, it is possible to collect the pieces of split data, so it is possible to determine whether the internal data has been modified. Thus, the reliability of the network system improves.

Alternative Embodiments

Note that the above-described embodiments may be modified into the following embodiments.

In the above-described embodiments, the network 19 is formed of a controller area network (CAN). However, the configuration is not limited to it. As long as the network allows intercommunication (network communication) among ECUs, and the like, connected to the network, the network may be formed of another type of network, such as Ethernet (trademark), Flex Ray (trademark) and IEEE1394 (FireWire (trademark)). By so doing, the flexibility of the configuration of the vehicle network system improves.

Figure 8:
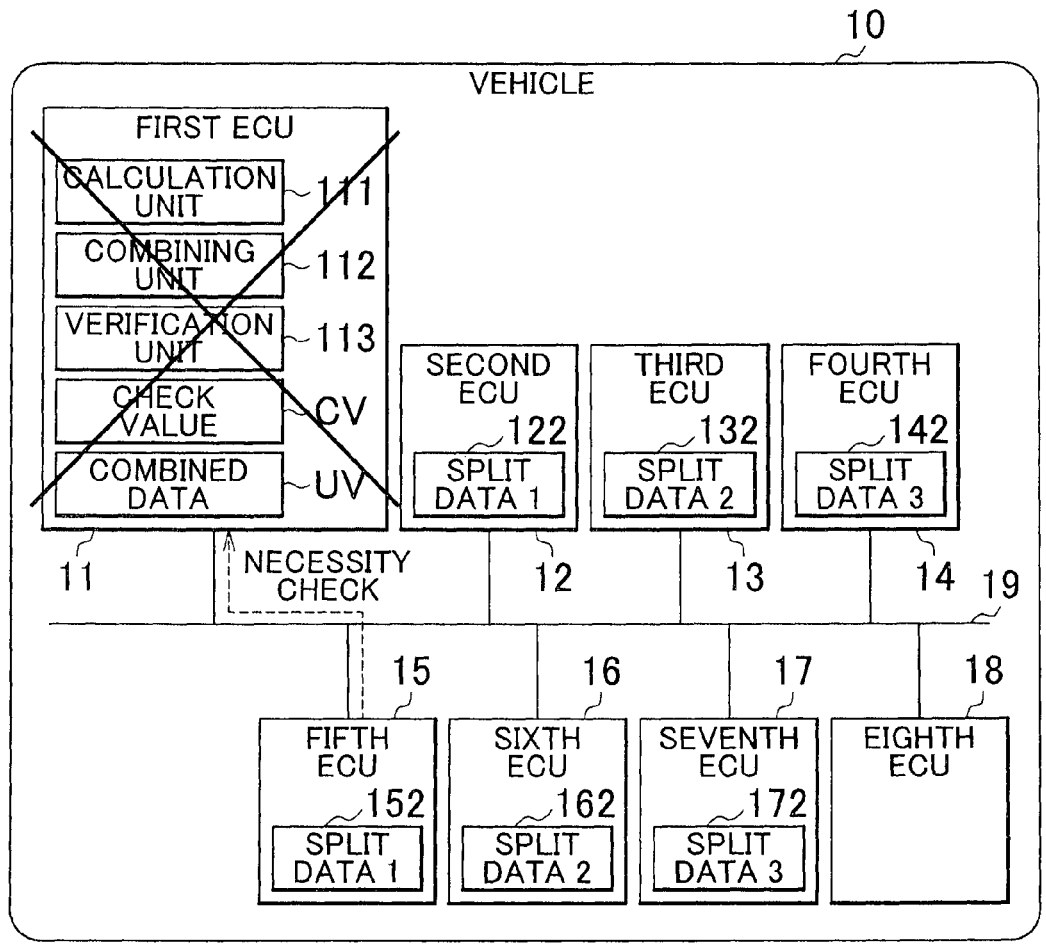
FIG. 8 is a schematic view that schematically shows a confirmation of the necessity of the split data in a vehicle network system according to an alternative embodiment of the invention.

In the above second embodiment, the description is made on the case where the eleventh ECU 21 deletes the pieces of split data 1 to 3 held by the second to seventh ECUs 12 to 17 that are other ECUs. However, the configuration is not limited to it. It is applicable that other ECUs holding split data each determine the necessity of the held split data and, when it is determined that it is not necessary, delete the held split data. For example, as shown in FIG. 8, the fifth ECU 15 may have a necessity checking function as the function of managing split data. That is, the necessity checking function inquires the first ECU 11 corresponding to split data 1 about the necessity of the split data 1 and maintains or deletes the split data 1 in response to a reply to the inquiry. That is, the fifth ECU 15 inquires the first ECU 11 about the necessity of the split data 1 and, when an affirmative reply is obtained from the first ECU 11, continuously holds the split data 1. On the other hand, when the fifth ECU 15 obtains a negative reply to the inquiry from the first ECU 11 or no response from the first ECU 11 succeeds a predetermined number of times, the fifth ECU 15 deletes the split data 1. This prevents accumulation of unnecessary split data in the fifth ECU 15. Note that the above necessity checking function may be provided for any ECU, or the like, as long as the ECU, or the like, holds split data. By so doing, the function of the vehicle network system is appropriately maintained.

Figure 9:
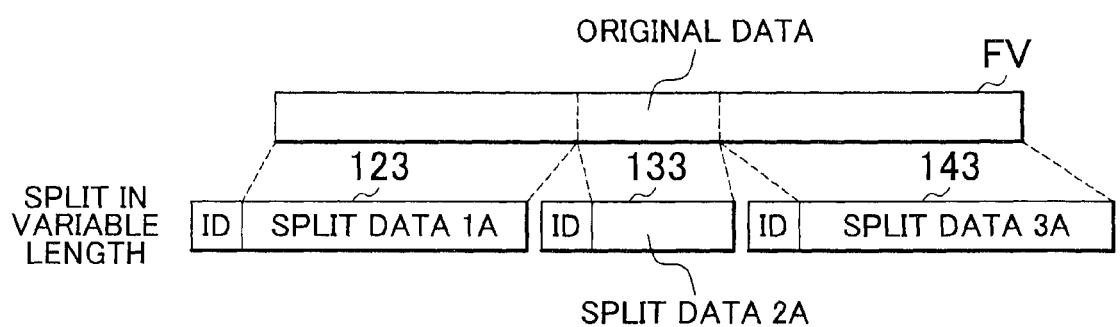
FIG. 9 is a schematic view that schematically shows pieces of split data in a vehicle network system according to an alternative embodiment of the invention.

In the above-described third embodiment, the description is made on the case where the original data FV is split into three with a fixed length to generate the pieces of split data 1 to 3. However, the configuration is not limited to it. A plurality of pieces of split data may be generated by splitting the original data into three with a variable length. For example, as shown in FIG. 9, by splitting the original data FV such that pieces of split data have at least two or more types of lengths (data lengths), split data 1A, split data 2A and split data 3A that are formed of at least two or more types of lengths are generated. At this time, the splitting length (data length) may be preset or may be calculated using a random number, or the like, each time. When the data length of split data is varied in this way, it becomes further difficult to generate split data, so it is possible to make modification determination using the split data with higher security. By so doing, security of the vehicle network system further improves.

In the above-described second embodiment, the description is made on the case where reprogramming is performed by the reprogramming device 20 connected to the network 19 at a dealer. However, the configuration is not limited to it. The reprogramming device 20 may be a small-sized device, such as a tester, or may be a large-sized device, such as a center. By so doing, the flexibility of design of the vehicle network system improves.

In the above-described second embodiment, the description is made on the case where the original data FV is split into five, and, in the above-described third embodiment, the description is made on the case where the original data FV is split into three. However, the configuration is not limited to it. The number of splits of the original data may be larger than 5 or 3 or may be smaller than 5 or 3. By so doing, the flexibility of design of the vehicle network system improves.

In the above-described third embodiment, the description is made on the case where pieces of split data are distributed to the ECUs in round-robin scheduling; however, the configuration is not limited to it. As long as it is possible to collect pieces of split data when it is determined whether internal data has been modified, the pieces of split data may be distributed by another distribution method, such as another distribution algorithm and a random method. By so doing, the flexibility of design of the vehicle network system improves.

Incidentally, as in the case of the above-described third embodiment, when the first ECU 11 is not able to communicate with the second ECU 12, the first ECU 11 may redistribute the pieces of split data to the third to eighth ECUs 13 to 18. By so doing, it is possible to maintain the redundancy of split data.

In the above-described embodiments, the description is made on the case where collected pieces of split data are combined in order of collection; however, the configuration is not limited to it. By adding information, by which the order is identifiable, to pieces of split data, it is possible to properly combine the pieces of split data irrespective of the order of collection. By so doing, the flexibility of design of the vehicle network system improves.

In the above-described embodiments, the description is made on the case where the first ECU 11 or the eleventh ECU 21 intended for determination as to whether the internal data has been modified does not hold split data based on its own original data FV. However, the configuration is not limited to it. An ECU intended for modification determination, such as the first ECU 11 (or the eleventh ECU 21) may hold part of pieces of split data. By so doing, the flexibility of the configuration of the network system improves.

In the above-described embodiments, the description is made on the case where the second ECU 12 and the fourth to seventh ECUs 14 to 17 each hold one split data. However, the configuration is not limited to it. Each ECU may hold a plurality of pieces of split data. At this time, when corresponding ECUs are identifiable, it is possible to hold a plurality of pieces of split data of the plurality of ECUs. In addition, as long as the order of pieces of split data is identifiable, it is possible to hold the plurality of pieces of split data in one ECU as well. By so doing, the flexibility of the configuration of the vehicle network system improves.

In the above-described second embodiment, the description is made on the case where the eleventh ECU 21 includes the distribution unit 214. However, the configuration is not limited to it. The distribution unit may be included in an ECU other than the eleventh ECU 21. That is, as long as the distribution unit is able to acquire original data FV of the eleventh ECU 21 and to distribute pieces of split data to other ECUs, the distribution unit may be included in any ECU. By so doing, the flexibility of the configuration of the vehicle network system improves.

In the above-described embodiments, the description is made on the case where the each-time (present-time) check value CV is held in the first ECU 11 or the eleventh ECU 21; however, the configuration is not limited to it. As long as it is possible to acquire an each-time check value CV at the time of determination as to whether the internal data has been modified, the each-time check value CV may be held in one of the other ECUs, or the like, other than the first ECU 11 (or the eleventh ECU 21). By so doing, the flexibility of the configuration of the vehicle network system improves.

In the above-described embodiments, the description is made on the case where the first ECU 11 includes the calculation unit 111, the combining unit 112 and the verification unit 113 or the case where the eleventh ECU 21 includes the calculation unit 211, the combining unit 212 and the verification unit 213. However, the configuration is not limited to it. At least one of the calculation unit, the combining unit and the verification unit may be included in an ECU other than the first ECU 11 (or the eleventh ECU 21). That is, the calculation unit may be included in anywhere as long as the calculation unit is able to acquire the internal data of the first ECU 11 (or the eleventh ECU 21). The combining unit may be included in anywhere as long as the combining unit is able to collect pieces of split data. The verification unit may be included in anywhere as long as the verification unit is able to obtain the each-time check value CV and combined data UV of an ECU intended for modification determination. By so doing, the flexibility of the configuration of the vehicle network system improves.

In the above-described embodiments, the description is made on the case where the original data FV and the check value CV are hash values; however, the configuration is not limited to it. The original data FV and the check value CV may be any values that allow determination as to identification of the internal data of an ECU intended for determination as to whether the internal data has been modified. For example, a value, such as a checksum, obtained through an algorithm different from a hash function may be employed as a check value CV. By so doing, the flexibility of the configuration of the vehicle network system improves.

In the above-described embodiments, the description is made on the case where the first ECU 11 or the eleventh ECU 21 makes determination as to whether the internal data has been modified. However, the configuration is not limited to it. As long as it is possible to acquire a check value CV and combined data UV of an ECU, or the like, intended for determination as to whether the internal data has been modified, via the network, one of the other ECUs, which includes a gateway device, or the like, may determine whether the internal data of the intended ECU has been modified on the basis of those acquired check value CV and combined data UV. By so doing, the flexibility of the configuration of the vehicle network system improves.

In the above-described embodiments, the description is made on the case where the configuration of the first ECU 11 or eleventh ECU 21 differs from the configuration of the second to eighth ECUs 12 to 18. However, the configuration is not limited to it. The configuration of each of the second to eighth ECUs 12 to 18 may be the same as the configuration of the first ECU 11 or eleventh ECU 21. When each of the second to eighth ECUs 12 to 18 has a similar configuration to that of the first ECU 11, the second to eighth ECUs 12 to 18 each are also able to determine whether the internal data has been modified. By so doing, the flexibility of the configuration of the network system improves.

In the above-described embodiments, the description is made on the case where the vehicle network system is mounted on the vehicle 10; however, the configuration is not limited to it. Part of the vehicle network system may be provided outside the vehicle. That is, part of the ECUs of the vehicle network system may be provided outside the vehicle through wireless communication. By so doing, the flexibility of the configuration of the vehicle network system improves.

In the above-described embodiments, first data may be used as third data. By so doing, the flexibility of the configuration of the vehicle network system improves.

The invention claimed is:

1. A vehicle network system comprising:
a plurality of electronic control units that are connected to a vehicle network so as to be communicable with each other and that allow internal data to be modified, wherein
a predetermined electronic control unit that is one of the plurality of electronic control units generates first data on the basis of the internal data held in the predetermined electronic control unit,
at least one of the plurality of electronic control units compares second data with third data, the second data created by collecting and combining pieces of split data, the pieces of split data each split from the first data and the pieces of split data distributed and held in the plurality of electronic control units, and the third data generated, after the pieces of split data are split from the first data and the pieces of split data are distributed, on the basis of internal data held by the predetermined electronic control unit at each point in time, and
it is determined whether the internal data held in the predetermined electronic control unit has been modified on the basis of a result of the comparison.

2. The vehicle network system according to claim 1, wherein
the predetermined electronic control unit makes a comparison between the second data and the third data.

3. The vehicle network system according to claim 1, wherein
the predetermined electronic control unit holds the second data and the third data.

4. The vehicle network system according to claim 1, wherein
the predetermined electronic control unit generates the first data and the third data.

5. The vehicle network system according to claim 1, wherein
the predetermined electronic control unit splits the first data into a plurality of pieces of split data and distributes the plurality of pieces of split data among the plurality of electronic control units.

6. The vehicle network system according to claim 1, wherein
the split data is also distributed to the predetermined electronic control unit.

7. The vehicle network system according to claim 6, wherein
the predetermined electronic control unit allows the internal data to be modified through communication, and
when the internal data of the predetermined electronic control unit is modified, the split data held in the predetermined electronic control unit is moved to one of the other electronic control units.

8. The vehicle network system according to claim 7, wherein
after the internal data of the predetermined electronic control unit has been modified, the one of the other electronic control units moves the split data, moved to the one of the other electronic control units, to the predetermined electronic control unit.

9. A vehicle information processing method used in a vehicle network system in which a plurality of electronic control units are connected so as to be communicable with each other, comprising:
generating first data in advance on the basis of internal data held in a predetermined electronic control unit;
splitting the generated first data into a plurality of pieces of split data;
distributing the plurality of pieces of split data among the plurality of electronic control units;
generating second data by collecting and combining the plurality of pieces of split data;
generating, after the generated first data is split into the plurality of pieces of split data and the pieces of split data are distributed, third data on the basis of internal data held in the predetermined electronic control unit at each point in time; and
determining whether the internal data held in the predetermined electronic control unit has been modified through a comparison between the second data and the third data.

10. The vehicle information processing method according to claim 9, wherein
the comparison between the second data and the third data is made by the predetermined electronic control unit.

11. The vehicle information processing method according to claim 9, wherein
the second data and the third data are held by the predetermined electronic control unit.

12. The vehicle information processing method according to claim 9, wherein
the first data and the third data are generated by the predetermined electronic control unit.

13. The vehicle information processing method according to claim 9, wherein
the pieces of split data, split from the first data, is distributed among the plurality of electronic control units by the predetermined electronic control unit.

14. The vehicle information processing method according to claim 9, wherein
the split data is also distributed to the predetermined electronic control unit.

15. The vehicle information processing method according to claim 14, wherein
the predetermined electronic control unit allows the internal data to be modified through communication, the information processing method further comprising:
when the internal data is modified, moving the split data, distributed to the predetermined electronic control unit, to one of the other electronic control units.

16. The vehicle information processing method according to claim 15, further comprising:
after the internal data has been modified, moving the split data, moved to the one of the other electronic control units, to the predetermined electronic control unit.

17. A vehicle network system comprising:
a plurality of electronic control units that are connected to a vehicle network so as to be communicable with each other and that allow internal data to be modified, wherein the plurality of electronic control units generate first data on the basis of internal data held in a first electronic control unit that is one of the plurality of electronic control units, the plurality of electronic control units generates second data created by collecting and combining pieces of split data, the pieces of split data each split from the first data such that each piece of the split data contains a portion of first data and the pieces of split data distributed and held in the plurality of electronic control units, and the plurality of electronic control units determine whether the internal data held in the first electronic control unit has been modified through a comparison between the first data and the second data, made by at least one of the plurality of electronic control units.

18. A vehicle network system comprising:

a plurality of electronic control units that are connected to a vehicle network so as to be communicable with each other and that allow internal data to be modified, wherein a first electronic control unit that is one of the plurality of electronic control units includes:

a generating unit that generates first data on the basis of the internal data held in a predetermined electronic control unit;

a splitting unit that splits the generated first data to generate a plurality of pieces of split data;

a distributing unit that distributes the pieces of split data among the plurality of electronic control units and causes the plurality of electronic control units to hold the pieces of split data;

a combining unit that collects and combines the pieces of split data, distributed and held in the plurality of electronic control units, to generate second data; and a determining unit that determines whether the internal data held in the predetermined electronic control unit has been modified on the basis of a comparison between the second data and third data generated, after the generated first data is split into the plurality of pieces of split data and the pieces of split data are distributed, on the basis of internal data held in the predetermined electronic control unit at each point in time.

19. The vehicle network system according to claim 17, wherein each piece of the split data contains a different portion of the first data.

* * * * *